United States Patent
Fu et al.

(10) Patent No.: US 12,133,252 B2
(45) Date of Patent: Oct. 29, 2024

(54) RESOURCE CONFLICT HANDLING METHOD AND APPARATUS, TERMINAL AND STORAGE MEDIUM

(71) Applicant: GUANGDONG OPPO MOBILE TELECOMMUNICATIONS CORP., LTD., Dongguan (CN)

(72) Inventors: Zhe Fu, Dongguan (CN); Jing Xu, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 336 days.

(21) Appl. No.: 17/720,611

(22) Filed: Apr. 14, 2022

(65) Prior Publication Data

US 2022/0240267 A1 Jul. 28, 2022

Related U.S. Application Data

(63) Continuation of application No. PCT/CN2019/122717, filed on Dec. 3, 2019.

(51) Int. Cl.
*H04W 72/56* (2023.01)
*H04L 1/08* (2006.01)
(Continued)

(52) U.S. Cl.
CPC ............. *H04W 72/56* (2023.01); *H04L 1/08* (2013.01); *H04W 72/0446* (2013.01); *H04W 72/21* (2023.01)

(58) Field of Classification Search
None
See application file for complete search history.

(56) References Cited

U.S. PATENT DOCUMENTS

| 2016/0183231 A1* | 6/2016 | Shi | H04L 1/08 370/329 |
| 2018/0041996 A1* | 2/2018 | Ye | H04W 74/006 |

(Continued)

FOREIGN PATENT DOCUMENTS

| CN | 103391159 A | 11/2013 |
| CN | 109150424 A | 1/2019 |

(Continued)

OTHER PUBLICATIONS

Communication pursuant to Article 94(3) EPC for European application 19955391.8 mailed Feb. 22, 2023.

(Continued)

*Primary Examiner* — Phirin Sam
(74) *Attorney, Agent, or Firm* — Sheppard, Mullin, Richter & Hampton LLP

(57) ABSTRACT

The present disclosure provides a resource conflict handling method and apparatus, a terminal, and a storage medium. The method includes: transmitting, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block over the fourth PUSCH. The first PUSCH is configured for repeated transmissions of the data block. In this way, the problem of conflict handling in the conflict scenario where the third PUSCH is present can be clarified. Here, available resources can be used as much as possible, and the resource utilization can be guaranteed, such that traffic can be transmitted to a network device as quickly as possible to avoid the delay caused by the resource conflict.

6 Claims, 2 Drawing Sheets

Transmit, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block over the fourth PUSCH, wherein the first PUSCH is configured for repeated transmissions of the data block

301

(51) Int. Cl.
  *H04W 72/0446* (2023.01)
  *H04W 72/21* (2023.01)

(56) References Cited

U.S. PATENT DOCUMENTS

| | | | | |
|---|---|---|---|---|
| 2018/0288746 | A1* | 10/2018 | Zhang | H04L 12/189 |
| 2018/0294932 | A1* | 10/2018 | Abdelmonem | H04L 43/0829 |
| 2019/0053211 | A1* | 2/2019 | Ying | H04W 72/044 |
| 2020/0068620 | A1* | 2/2020 | Kim | H04L 5/0053 |
| 2020/0169988 | A1* | 5/2020 | Wu | H04L 5/0091 |
| 2020/0260442 | A1* | 8/2020 | Yi | H04L 5/14 |
| 2021/0022158 | A1* | 1/2021 | Wei | H04L 5/0044 |
| 2021/0282169 | A1* | 9/2021 | Zhang | H04W 72/56 |
| 2022/0346092 | A1* | 10/2022 | Choi | H04W 74/0833 |
| 2023/0217504 | A1* | 7/2023 | Xiong | H04W 74/0891 |
| | | | | 370/329 |
| 2023/0232344 | A1* | 7/2023 | Yang | H04W 52/38 |
| | | | | 370/329 |
| 2024/0106611 | A1* | 3/2024 | Wang | H04L 5/0091 |

FOREIGN PATENT DOCUMENTS

| | | |
|---|---|---|
| CN | 109728882 A | 5/2019 |
| CN | 109756979 A | 5/2019 |
| CN | 110149705 A | 8/2019 |
| CN | 110351046 A | 10/2019 |
| WO | 2018170670 A1 | 9/2018 |
| WO | 2019162929 A1 | 8/2019 |

OTHER PUBLICATIONS

First Examination Report dated Sep. 8, 2022 received in Indian Patent Application No. IN202227024398. Translation included.
Extended European Search Report dated Aug. 8, 2022 received in European Patent Application No. EP19955391.8.
Samsung: "Update on Summary of Collision Handling Aspects for LC/CE UEs", 3GPP Draft; RI-161377 Collis Ion Handling Summary_V1, 3rd Generation Partnership Project (3GPP), Mobile Competence Centre; 650, Route Des Lucioles; F-06921 Sophia-Ant Ipolis Cedex; France, vol. RAN WG1, No. St Julians, Malta; Feb. 15, 2016-Feb. 19, 2016 Feb. 24, 2016 (Feb. 24, 2016) ,XP051079299.
Wilus Inc: "On PUSCH enhancement for NR URLLC", 3GPP Draft; RI-1911317_PUSCH_FINAL, 3rd Generation Partnership Project (3GPP), Mobile Competence Centre; 650, Route Des Lucioles; F-06921 Sophia-Ant Ipolis Cedex; France vol. RAN WG1, No. Chongqing, China; Oct. 14, 2019-Oct. 20, 2019 Oct. 8, 2019 (Oct. 8, 2019), XP051809315.
Nokia Nokia Shanghaibell: "Summary of contributions on PUSCH enhancements for NR eURLLC (A17.2.6.3)", 3GPP Draft; RI-1911402_Summary of Contributions On 7.2.6.3_EURLLC PUSCH ENH, 3rd Generation Partnership Project (3GPP) ,Mobile Competence Centre; 650, Route Des Lucioles; F-06921 Sophia-Antipolis CE vol. RAN WG1, No. Chongqing, China;Oct. 14, 2019-Oct. 20, 2019 Oct. 22, 2019 (Oct. 22, 2019), XP051798677.
LG Electronics: "HARQ procedure for NR-U", 3GPP Draft; RI-1912391, 3rd Generation Partnership Project (3GPP), Mobile Competence Centre; 650, Route Des Lucioles; F-06921 Sophia-Anipolis Cedex; France vol. RAN WG1, No. Reno, USA; Nov. 18, 2019-Nov. 22, 2019 Nov. 9, 2019 (Nov. 9, 2019), pp. 1-22 ,XP051823397.
International Search Report and Written Opinion dated Aug. 31, 2020 in International Application No. PCT/CN2019/122717. English translation attached.
Ericsson. "On intra-UE prioritization enablers", 3GPP TSG RAN WG1 Meeting #97 Tdoc R1-1906097, May 17, 2019 (May 17, 2019), Section 2.
Catt. "PUSCH enhancements for URLLC", 3GPP TSG RAN WG1 Meeting #97 R1-1906329, May 17, 2019 (May 17, 2019), Section 2.
ZTE. "Conflicts among multiple configured grant PUSCH", 3GPP TSG RAN WG1 #97 R1-1906418, May 17, 2019 (May 17, 2019), Section 2.
3rd Generation Partnership Project; Technical Specification Group Radio Access Network; NR; Physical layer procedures for control (Release 16), 3GPP TS 38.213 V16.5.0 (Mar. 2021).
3rd Generation Partnership Project; Technical Specification Group Radio Access Network; NR; Physical layer procedures for data (Release 16), 3GPP TS 38.214 V16.5.0 (Mar. 2021).
3rd Generation Partnership Project; Technical Specification Group Radio Access Network; NR; Radio Resource Control (RRC) protocol specification (Release 16), 3GPP TS 38.331 V16.5.0 (Jun. 2021).
Nokia, Nokia Shanghai Bell."Summary of contributions on PUSCH enhancements for NR eURLLC (AI 7.2.6.3)",3GPP TSG-RAN WG1 Meeting #97 R1-1907695, May 14, 2019(May 14, 2019).
The Grant Notice from corresponding Chinese Application No. 202210495293.X, dated May 25, 2023. English translation attached.
Nokia, Nokia Shanghai Bell, RP-190190 "New WID: Support of NR Industrial Internet of Things (IoT)"3GPP tsg_ran \tsg_ran, tsgr_83,Mar. 12, 2019, full text, 15 pages.

* cited by examiner

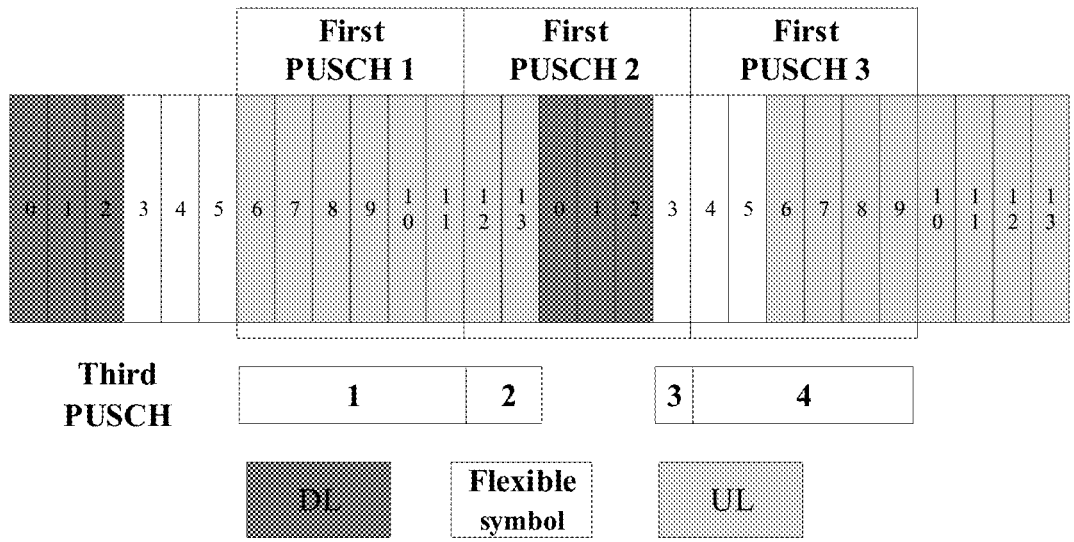

FIG. 1

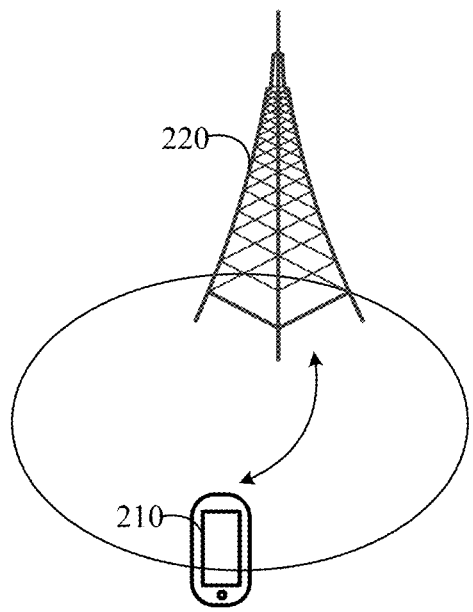

FIG. 2

Transmit, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block over the fourth PUSCH, wherein the first PUSCH is configured for repeated transmissions of the data block    301

FIG. 3

RESOURCE CONFLICT HANDLING METHOD AND APPARATUS, TERMINAL AND STORAGE MEDIUM

CROSS-REFERENCE TO RELATED APPLICATIONS

The present application is a continuation of International Application No. PCT/CN2019/122717 filed on Dec. 3, 2019, which is hereby incorporated by reference in its entirety.

TECHNICAL FIELD

The present disclosure relates to communication technology, and more particularly, to a resource conflict handling method and apparatus, a terminal, and a storage medium.

BACKGROUND

In order to improve reliable transmission of Physical Uplink Share Channel (PUSCH), repeated transmissions of PUSCH have been introduced in New Radio (NR). That is, a PUSCH carrying the same data is transmitted repeatedly for a number of times in a period of time. Generally, PUSCH resources configured by a network device for such repeated transmissions can be defined as a nominal PUSCH.

Currently, the repeated transmissions of the nominal PUSCH can be cross-slot. Exemplarily, when a repeated transmission crosses a boundary of a slot, or when a repeated transmission is segmented by, or conflicts with, a downlink symbol/flexible symbol configured by a network device, the nominal PUSCH can be segmented into a plurality of PUSCHs for transmission. Each PUSCH as a result of such segmentation is usually referred to as an actual PUSCH, as shown in FIG. 1.

In a communication system, it is unavoidable that some resources may conflict in the time domain. Currently, how to solve the problem of resource conflict for a nominal PUSCH that can be segmented has become a hot topic of research.

SUMMARY

The embodiments of the present disclosure provide a resource conflict handling method and apparatus, a terminal, and a storage medium, capable of solving the problem of resource conflict for a nominal PUSCH that can be segmented. The technical solutions are as follows.

In an aspect, a resource conflict handling method is provided. The method includes: transmitting, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block over the fourth PUSCH. The first PUSCH is configured for repeated transmissions of the data block.

In another aspect, a resource conflict handling apparatus is provided. The apparatus includes: a transmission module configured to transmit, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block over the fourth PUSCH. The first PUSCH is configured for repeated transmissions of the data block.

In yet another aspect, a terminal is provided. The terminal includes a processor and a memory. The memory stores at least one instruction executable by the processor to implement the resource conflict handling method according to any one of the above aspects.

In still another aspect, a computer-readable storage medium is provided. The computer-readable storage medium stores at least one instruction executable by the processor to implement the resource conflict handling method according to any one of the above aspects.

In still yet another aspect, a computer program product is provided. The computer program product includes one or more computer programs which, when executed by a processor, implement the resource conflict handling method according to any one of the above aspects.

The technical solutions according to the embodiments of the present disclosure can achieve at least the following advantageous effects.

When a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block can be transmitted over the fourth PUSCH. The first PUSCH is configured for repeated transmissions of the data block. In this way, the problem of conflict handling in the conflict scenario where the third PUSCH is present can be clarified. Here, available resources can be used as much as possible, and the resource utilization can be guaranteed, such that traffic can be transmitted to a network device as quickly as possible to avoid the delay caused by the resource conflict.

BRIEF DESCRIPTION OF DRAWINGS

In order to describe the technical solutions in the embodiments of the present disclosure more clearly, the drawings to be used in the description of the embodiments will be briefly introduced below. Obviously, the drawings in the following description are only some embodiments of the present disclosure, and other drawings can be obtained by those of ordinary skill in the art based on these drawings without any inventive efforts.

FIG. 1 is a schematic diagram showing a first PUSCH according to an exemplary embodiment of the present disclosure;

FIG. 2 is a schematic diagram showing an implementation environment according to an exemplary embodiment of the present disclosure;

FIG. 3 is a flowchart illustrating a resource conflict handling method according to an exemplary embodiment of the present disclosure;

DESCRIPTION OF EMBODIMENTS

Figure 4:
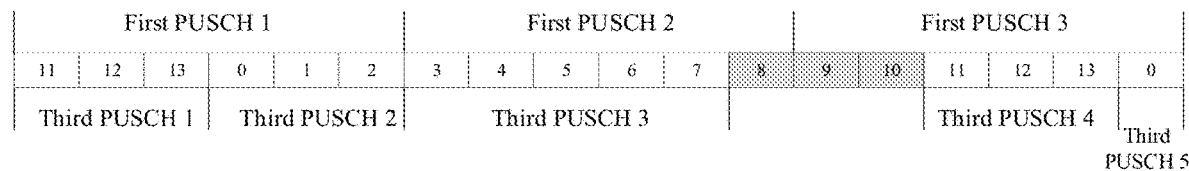
FIG. 4 is a schematic diagram showing a first PUSCH according to another exemplary embodiment of the present disclosure.

The embodiments of the present disclosure will be further described in detail below with reference to the accompanying drawings, such that the objects, technical solutions, and advantages of the present disclosure will become more apparent.

Before introducing the resource conflict handling method according to the embodiments of the present disclosure, some relevant content, application scenarios, and implementation environments involved in the embodiments of the present disclosure will be introduced briefly.

First, some related content involved in the embodiments of the present disclosure will be introduced briefly.

Industrial Internet of Things (IIoT) scenario: The $5^{th}$ Generation (5G) IIoT scenarios need to support transmission of traffic, such as factory automation, transport industry, and electrical power distribution in 5G systems. It has relatively high requirements on data transmission delay and reliability. Based on the transmission requirements on delay and reliability, concepts such as Time Sensitive Networking (TSN) and Time Sensitive Communication (TSC) have also been introduced in the IIoT scenario.

Logical Channel Prioritization (LCP): When a User Equipment (UE) acquires uplink resources for new transmissions, data transmissions are performed according to priorities of logical channels. The UE prioritizes the logical channels according to the following orders of priorities (in the descending order of priorities):

1) Cell Radio Network Temporary Identity (C-RNTI) Media Access Control (MAC) Control Element (CE) or data from Uplink Common Control Channel (UL-CCCH);
2) Configured Grant Confirmation MAC CE;
3) Buffer Status Report (BSR) MAC CE other than padding BSR;
4) Single Entry PHR MAC CE or Multiple Entry PHR MAC CE;
5) Data from any logical channel other than UL-CCCH;
6) MAC CE for Recommended Bit Rate Query; and
7) BSR MAC CE for padding BSR.

Semi-static configuration: In order to support periodic services with basically fixed traffic and reduce the overhead of frequent Physical Downlink Control Channel (PDCCH) scheduling, NR can support semi-static resource configuration. Here, the semi-static resource configuration means that the network device allocates scheduled resources to the terminal via Downlink Control Information (DCI) carried in the PDCCH, and the terminal transmits or receives traffic data according to the scheduled resources periodically. Semi-static resource configuration may include a Configuration Grant (CG) for Uplink (UL) and Semi-Persistent Scheduling (SPS) for Downlink (DL). For the CG, it can include two types, namely type1 and type2. Here, a type1 CG can be used or configured, i.e., activated, by a UE when the UE receives an RRC configuration. For a type2 CG, after a UE receives an RRC configuration, the UE stores the RRC configuration and activates (uses) or deactivates (does not use) the CG resource when it subsequently receives a DCI indicating activation or deactivation of the CG.

Next, some application scenarios involved in the embodiments of the present disclosure will be introduced briefly.

On one hand, in order to improve the transmission reliability of PUSCH, repeated transmissions of PUSCH have been introduced in NR. That is, a PUSCH carrying the same data is transmitted a number of times within a period of time. From the perspective of time domain resources, in R15, the repeated transmissions of PUSCH are based on repeated transmissions at the slot level. That is, PUSCH resources occupied by the repeated transmissions are located in one slot and will not cross slots. However, in R16, cross-slot repeated transmissions of PUSCH are introduced. That is, the PUSCH resources occupied by the repeated transmissions may occupy symbols from two slots, and the specific occupied resource positions can be configured by the network device. In some embodiments, the repeated transmissions configured by the network device are defined as nominal repetitions, and correspondingly, the PUSCH resources for the repeated transmissions may be defined as nominal PUSCHs. When a nominal repetition in the repeated transmissions crosses a slot boundary, or conflicts with a downlink symbol configured by the network device, the nominal repetition will be segmented into two or more PUSCHs for transmission. The PUSCHs as a result of the segmentation is referred to as actual PUSCHs. In this embodiment, the nominal PUSCH is a first PUSCH, and the actual PUSCH included in the nominal PUSCH is a third PUSCH. For example, as shown in FIG. 1, three first PUSCHs are included, and the three first PUSCHs include four third PUSCHs, where actual PUSCH1 is equal to nominal PUSCH1, that is, after the introduction of the concept of the actual PUSCH, the non-segmented nominal PUSCH can also be regarded as an actual PUSCH. In addition, nominal PUSCH2 in FIG. 1 includes two third PUSCHs, actual PUSCH2 and actual PUSCH3, and nominal PUSCH3 is equal to actual PUSCH4. In this way, data blocks are transmitted at the granularity of third PUSCHs.

On the other hand, in some service scenarios, resources allocated to the same terminal may conflict in time, and resource conflicts are common especially in service scenarios that are sensitive to latency requirements, such as 5G IIoT scenarios. In such IIoT scenarios, different services have different Quality of Service (QoS) requirements. For example, some services are sensitive to delay, and some services have strict requirements on packet loss rate. Thus, a Hybrid Automatic Repeat reQuest (HARQ) function can be used to configure HARQ processes for data transmissions, thereby reducing transmission delay or improving transmission reliability. That is, in such scenarios, data retransmission is usually required for communication. In this process, the resources configured for the same user will inevitably conflict in time. Of course, there will also be cases where conflicts between multiple new transmission resources occur. Here, the conflicts may include a conflict between a data channel and another data channel, a conflict between a data channel and a control channel (or Uplink Control Information (UCI)), and a conflict between a control channel (or UCI) and another control channel (or UCI). The UCI may be at least one of: Scheduling Request (SR), HARQ feedback, and Channel State Information Reference Signal (CSI-RS). In addition, in the above scenario of the conflict between data channels, the data channel may be at least one of: Configured Grant (CG), Dynamic Grant (DG), and SPS, where the CG may include type1 CG and/or type2 CG. DG resources can be scheduled in Configured Scheduling (CS)-RNTI, Temporary Cell (TC)-RNTI, C-RNTI, or Random Access (RA)-RNTI (i.e., Random Access Response (RAR)). Of course, resources can be configured or scheduled on an uplink or on a sidelink.

Currently, only the issue of conflict in the case of nominal repetition is considered in the Rel-16 IIoT, and there is no discussion or definition on how to handle the conflict after a nominal repetition is segmented into actual repetitions. In this way, when PUSCH segmentation is supported and the conflicting resources are resources as a result of the segmentation, if the terminal still operates in the legacy manner, the resources will be wasted and an unnecessary delay will be caused. In view of this, the embodiments of the present disclosure provide a solution, which can be applied to an uplink scenario or a sidelink scenario. For specific implementations, reference can be made to the following embodiments.

Next, the implementation environments involved in the embodiments of the present disclosure will be introduced briefly.

FIG. 2 is a schematic diagram showing an implementation environment according to an exemplary embodiment. The implementation environment includes at least one terminal 210 and a network device 220. In FIG. 2, one terminal is shown as an example for illustration. Data communication can be performed between the terminal 210 and the network device 220 through a communication network. The terminal 210 and the network device 220 are provided with MAC entities, so as to implement data transmission at the MAC layer via the MAC entities. That is, in the embodiments of the present disclosure, the terminal can implement the data transmission method using the MAC entity. As an example, the terminal 210 may be a device that can be used for data communication, such as a mobile phone or a tablet computer. In some embodiments, the terminal may also be referred to as a UE. In addition, the network device may be a network device such as a base station. Here, in the sidelink scenario, the two communicating entities may also be two terminal devices.

After the related content, application scenarios, and implementation environments involved in the embodiments of the present disclosure are introduced, a resource conflict handling method according to an embodiment of the present disclosure will be described in detail below with reference to the figures.

FIG. 3 is a flowchart of a method for handling resource conflicts according to an exemplary embodiment. The method can be applied to the implementation environment shown in FIG. 2, and is mainly executed by a terminal. It includes the following implementation steps.

At step 301, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block is transmitted over the fourth PUSCH. The first PUSCH is configured for repeated transmissions of the data block.

Here, there may be one or more first PUSCHs, and the embodiment of the present disclosure is not limited to any specific number of first PUSCHs. In addition, there may be one or more third PUSCHs included in the first PUSCH, and correspondingly, there may be one or more fourth PUSCHs.

In addition, the first PUSCH may be pre-configured by a network device, or may be dynamically scheduled by the network. Exemplarily, the terminal may receive repeated transmission configuration information. The repeated transmission configuration information indicates at least one of a transmission start position, a number of repeated transmissions, and a time length of each repeated transmission for the first PUSCH. The terminal may determine a time domain resource of the third PUSCH based on the repeated transmission configuration information and first information. The first information is used to determine a presence of the third PUSCH, a resource position of the third PUSCH, or the presence of the third PUSCH and the resource position of the third PUSCH when the third PUSCH is determined to be present.

The number of first PUSCHs may be the same as the number of repeated transmissions. That is, one repeated transmission corresponds to one first PUSCH. It can be appreciated that the time length of each repeated transmission refers to the number of symbols occupied by the first PUSCH corresponding to each repeated transmission.

The first information may include at least one of slot boundary information, uplink/downlink configuration information, first resource indication information, and second resource indication information. Here, the first resource indication information may indicate a specified resource or a cross-boundary situation. The specified resource is not used as a transmission resource of the first PUSCH, and the second resource indication information includes target indication information and/or resource information. The target indication information indicates a presence of the third PUSCH and the resource information indicates a resource position of the third PUSCH.

The slot boundary information indicates a boundary of a slot. The uplink/downlink configuration information indicates which symbols are used for uplink transmission, which symbols are used for downlink transmission, and which symbols can be used for uplink transmission and downlink transmission.

When the first resource indication information indicates the specified resource, the specified resource refers to a resource that cannot be used for the first PUSCH. For example, it may be a Downlink (DL) symbol or a Flexible symbol. When the first resource indication information indicates the cross-boundary situation, it may be an explicit indication. For example, it may be "0", indicating cross-boundary, or it may be "0", indicating non-cross-boundary.

In fact, the above slot boundary information, uplink/downlink configuration information, and first resource indication information may be implicit information. That is, the terminal needs to combine them with the repeated transmission configuration information to determine whether the first PUSCH includes the third PUSCH, or determine the resource position of the third PUSCH included in the first PUSCH, or determine whether the first PUSCH includes the third PUSCH and, if so, the resource position of the third PUSCH.

Here, the second resource indication information may be in fact explicit information. That is, the second resource indication information directly indicates whether the first PUSCH includes the third PUSCH and/or, if so, a resource position of at least one corresponding third PUSCH. The resource information may be time domain information and/or frequency domain information. In addition, when the first information includes the second resource indication information, the terminal can further combine it with the repeated transmission configuration information for determining the first PUSCH, to accurately determine the resource position of the third PUSCH, thereby improving the accuracy of determination.

As an example, the first resource indication information and/or the second resource indication information may be configured by a network device. For example, the first resource indication information and/or the second resource indication information may be indicated by the network device via information, such as Radio Resource Control (RRC), DCI, or MAC CE. Alternatively, the first resource indication information and/or the second resource indication information may be indicated by a physical layer of the terminal.

In this way, the terminal can learn the resource position of the first PUSCH, the information on the presence of the third PUSCH, and the resource position of the third PUSCH included in the first PUSCH.

In operation, the terminal can detect whether there is resource overlap or conflict between the first PUSCH and the second PUSCH based on the resource position of the first PUSCH and the resource position of the second PUSCH. For example, when the resource position of the first PUSCH overlaps with the resource position of the second PUSCH, it is determined that there is a resource overlap between the first PUSCH and the second PUSCH.

As an example, when the third PUSCH included in the first PUSCH overlaps or conflicts with the second PUSCH with respect to time domain resources, it is determined that the first PUSCH and the second PUSCH overlap or conflict with respect to time domain resources. That is, for the first PUSCH, the determination may not be made at the granularity of the first PUSCH, but at the granularity of the third PUSCH, i.e., at the granularity of the actual PUSCH. For example, it can be determined whether there is a resource overlap or conflict by determining whether at least one or each third PUSCH overlaps or conflicts with the second PUSCH in the time domain.

It is to be noted that, the determination as to whether there is a resource overlap or conflict can be made at least based on the time domain, and in some embodiments, the determination may be made based further on the frequency domain. The embodiments of the present disclosure are not limited to any of these examples.

When it is determined that there is a resource overlap or conflict between the first PUSCH and the second PUSCH, it is determined whether there is a fourth PUSCH in the third PUSCH included in the first PUSCH that does not overlap or conflict with the second PUSCH with respect to time domain resources. If so, the data block is transmitted over the fourth PUSCH. It can be appreciated that the fourth PUSCH is actually the third PUSCH included in the first PUSCH that does not overlap or conflict with the second PUSCH with respect to time domain resources. There may be one or more fourth PUSCHs, and when there are more than one fourth PUSCH, the data block may be transmitted over each fourth PUSCH.

As an example, the first PUSCH may be a PUSCH of a first Configured Grant (CG), and the second PUSCH may be a PUSCH of a second CG.

The second PUSCH may be a nominal PUSCH, which may be segmented into actual PUSCHs. That is, the second PUSCH may also include at least one actual PUSCH. In this case, when determining the resource conflict (or overlap, and the following description will be given by taking the conflict as an example), it can be determined whether there is a resource conflict between at least one or each third PUSCH in the first PUSCH and the actual PUSCH(s) included in the second PUSCH.

That is, the first PUSCH may be a first CG resource, and the second PUSCH may be a second CG resource. In this case, the terminal detects whether there is a resource conflict between the actual CG resource included in the first CG resource and the second CG resource. When a resource conflict occurs between the actual CG resource included in the first CG resource and the second CG resource, it is determined that a resource conflict occurs between the first PUSCH and the second PUSCH, or, in other words, it is determined that a resource conflict occurs between the third PUSCH included in the first PUSCH and the second PUSCH.

Further, operations such as resource selection may also be performed according to the actual CG resource included in the first CG resource and the second CG resource.

It is to be noted that the first CG as used in the embodiments of the present disclosure refers to the first CG resource, and the first DG refers to the first DG resource. Similarly, the second CG refers to the second CG resource, and the second DG refers to the second CG resource.

As an example, the first PUSCH may be a PUSCH of a first CG, the second PUSCH may be a PUSCH indicated in a first RAR, or the second PUSCH may be a PUSCH of a first DG.

Here, the first RAR may be msg2 in a four-step random access process, or may be msgB in a two-step random access process. Taking the four-step random access process as an example, in the case of a beam transmission failure or a need to request uplink resources, the terminal may trigger the random access process. In an implementation, the terminal can transmit a random access request (i.e., msg1) to a network device, and the network device can transmit a first RAR (i.e., msg2) to the terminal based on the random access request. The first RAR indicates an uplink resource for transmitting msg3. Here, the uplink resource is the second PUSCH. In this case, the terminal detects whether there is a conflict between the actual CG resource included in the first CG resource and the PUSCH indicated in the first RAR, so as to determine whether there is a conflict between the first PUSCH and the second PUSCH.

Alternatively, the second PUSCH may be the first DG resource, which may be scrambled with a CS-RNTI, TC-RNTI, or C-RNTI. In this case, the terminal detects whether there is a conflict between the first CG resource and the first DG resource, so as to determine whether there is a resource conflict between the first PUSCH and the second PUSCH.

Similarly, in this implementation, the second PUSCH may also be a nominal PUSCH, which can be segmented into actual PUSCHs. That is, the second PUSCH may also include at least one actual PUSCH. In this case, when determining the resource conflict, it can be determined whether there is a resource conflict between at least one or each third PUSCH in the first PUSCH and the actual PUSCH(s) included in the second PUSCH.

As an example, the first PUSCH may be a PUSCH indicated in a first RAR, or the first PUSCH may be a PUSCH of a second DG, and the second PUSCH may be a PUSCH of a second CG.

As described above, the first RAR may be a msg2 in a four-step random access procedure, or may be a msgB in a two-step random access procedure. Here, the second DG may be scrambled with a CS-RNTI, TC-RNTI, or C-RNTI.

In this implementation, it is possible to detect whether there is a conflict between the PUSCH indicated in the first RAR and the second PUSCH, so as to determine whether there is a resource conflict between the first PUSCH and the second PUSCH, or, in other words, to determine whether there is a resource conflict between the third PUSCH included in the first PUSCH and the second PUSCH.

Alternatively, it may be detected whether there is a conflict between the actual DG resource included in the second DG resource and the second PUSCH, so as to determine whether there is a resource conflict between the first PUSCH and the second PUSCH.

Further, operations such as resource selection may also be performed according to the actual DG resource included in the second DG resource and the second PUSCH.

Similarly, in this implementation, the second PUSCH may also be a nominal PUSCH, which can be segmented into actual PUSCHs. That is, the second PUSCH may also include at least one actual PUSCH. In this case, when determining the resource conflict, it can be determined whether there is a resource conflict between at least one or each third PUSCH in the first PUSCH and the actual PUSCH(s) included in the second PUSCH.

As an example, the first PUSCH may be a PUSCH indicated in a first RAR, or the first PUSCH may be a PUSCH of a second DG, and the second PUSCH may be a PUSCH indicated in a second RAR.

Exemplarily, it may be detected whether there is a conflict between the actual DG resource included in the second DG and the PUSCH indicated in the second RAR, or between the actual DG resource included in the second DG and the third PUSCH included in the PUSCH indicated in the second RAR, so as to determine whether there is a resource conflict between the first PUSCH and the second PUSCH.

Further, operations such as resource selection can also be performed according to the actual DG resource included in the second DG and the PUSCH indicated in the second RAR, or according to the actual DG resource included in the second DG and the actual PUSCH included in the PUSCH indicated in the second RAR.

Similarly, in this implementation, the second PUSCH may also be a nominal PUSCH, which can be segmented into actual PUSCHs. That is, the second PUSCH may also include at least one actual PUSCH. In this case, when determining the resource conflict, it can be determined whether there is a resource conflict between at least one or each third PUSCH in the first PUSCH and the actual PUSCH(s) included in the second PUSCH.

As an example, the first PUSCH may be a PUSCH indicated in a first RAR, or the first PUSCH may be a PUSCH of a second DG, and the second PUSCH may be a PUSCH of a first DG.

Exemplarily, it may be detected whether there is a conflict between the actual DG resource included in the second DG and the actual DG resource included in the first DG, so as to determine whether there is a resource conflict between the first PUSCH and the second PUSCH.

Further, operations such as resource selection may also be performed according to the actual DG resource included in the second DG and the actual DG resource included in the first DG.

Similarly, in this implementation, the second PUSCH may also be a nominal PUSCH, which can be segmented into actual PUSCHs. That is, the second PUSCH may also include at least one actual PUSCH. In this case, when determining the resource conflict, it can be determined whether there is a resource conflict between at least one or each third PUSCH in the first PUSCH and the actual PUSCH(s) included in the second PUSCH.

Further, priorities of transmission resources may be determined based on the third PUSCH included in the first PUSCH and the second PUSCH. Specifically, when there is a fifth PUSCH in the third PUSCH that conflicts with the second PUSCH resource, a prioritized transmission resource may be determined at a granularity of fifth PUSCH. In some embodiments, it can also be understood that a non-prioritized transmission resource can be determined based on the third PUSCH included in the first PUSCH and the second PUSCH.

That is, the prioritized transmission resource in the event of resource conflict may be determined at a granularity of third PUSCH or first PUSCH. In other words, the non-prioritized transmission resource in the event of resource conflict may be determined at a granularity of third PUSCH or first PUSCH As an example, the operation of determining the priorities of the transmission resources based on the third PUSCH included in the first PUSCH and the second PUSCH may include: determining a prioritized transmission resource based on a first priority corresponding to a fifth PUSCH and a second priority corresponding to the second PUSCH. The fifth PUSCH is at least one third PUSCH in the third PUSCH that overlaps the second PUSCH with respect to time domain resources.

Of course, as an example, the priority of the fifth PUSCH as used herein may also be considered as the priority of the first PUSCH, and the same applies below.

That is, when there is a fifth PUSCH in the third PUSCH that conflicts with the second PUSCH resource, it can be determined which resource is prioritized for transmission based on the first priority corresponding to the fifth PUSCH and the second priority corresponding to the second PUSCH resource, and then the corresponding data block can be transmitted over the determined resource. Exemplarily, if the first priority corresponding to the fifth PUSCH is higher than the second priority corresponding to the second PUSCH, the data block is prioritized to be transmitted over the fifth PUSCH. In this case, the fifth PUSCH can be determined as the resource for transmitting the data block. On the other hand, if the first priority corresponding to the fifth PUSCH is lower than the second priority corresponding to the second PUSCH, the corresponding data block is prioritized to be transmitted over the second PUSCH.

It can be appreciated that there may be one or more fifth PUSCHs in the third PUSCH. When there are more than one fifth PUSCH, the first priority corresponding to each fifth PUSCH may be compared with the second priority of the second PUSCH, so as to determine which resource is to be prioritized for transmission.

It is to be noted that, as an example of the embodiment of the present disclosure, the UE may determine the priorities of other fifth PUSCHs based on the priority of the first fifth PUSCH or the resource of the first PUSCH.

As an example, the first priority may be a priority of a resource of the fifth PUSCH, and the second priority is a priority of a resource of the second PUSCH. That is, in the comparison process, the priorities of the two conflicting resources can be compared, so as to determine which resource is to be prioritized for transmission.

As an example, the first priority may be a priority of a first logical channel carried on a resource of the fifth PUSCH, and the second priority may be a priority of a second logical channel carried on a resource of the second PUSCH.

Of course, the priority of the first logical channel on the resource of the fifth PUSCH may also be considered as the priority of the first logical channel on the first PUSCH.

In this implementation, it may be determined which resource is prioritized for transmission by comparing the priorities of logical channels corresponding to two conflicting resources. For example, if the priority of the first logical channel carried on the resource of the fifth PUSCH is higher than the priority of the second logical channel carried on the resource of the second PUSCH, it may be determined that the data block is prioritized to be transmitted over the fifth PUSCH, or otherwise the corresponding data block is prioritized to be transmitted over the second PUSCH.

As an example, when the fifth PUSCH carries or is to carry at least one first logical channel, the first priority may be a priority of the first logical channel with a highest priority; and/or when the second PUSCH carries or is to carry at least one second logical channel, the second priority may be a priority of the second logical channel with a highest priority.

In other words, when there is a plurality of first logical channels, the first priority may include the highest priority among the priorities of the plurality of first logical channels; and/or, when there is a plurality of second logical channels, the second priority may include the highest priority among the priorities of the plurality of second logical channels.

That is, there may be a plurality of first logical channels that are carried or to be carried on the fifth PUSCH. In this case, the highest priority may be selected from the priorities of the plurality of first logical channels, and the highest priority may then be determined as the first priority.

Similarly, there may be a plurality of second logical channels that are carried or to be carried on the second PUSCH. In this case, the highest priority may be selected from the priorities of the plurality of second logical channels, and the highest priority may then be determined as the second priority.

Of course, it is to be noted that in the above description, the highest priority is selected as the first priority when there is a plurality of first logical channels as an example. In another example, one of the priorities of the plurality of first logical channels can be selected as the first priority according to some rule. For example, the first priority may alternatively be the priority of the first logical channel with the lowest priority. Similarly, when there is a plurality of second logical channels, one of the priorities of the plurality of second logical channels can be selected as the second priority according to some rule. For example, the second priority may alternatively be the priority of the second logical channel with the lowest priority. The embodiment of the present disclosure is not limited to any of these examples.

As an example, the first priority may be a priority of a first MAC CE corresponding to a resource of the fifth PUSCH, and the second priority may be a priority of a second MAC CE corresponding to a resource of the second PUSCH. The first MAC CE and the second MAC CE are in different MAC PDUs.

In this implementation, it may be determined which of the two conflicting resources is to be prioritized for transmission according to the priority of the first MAC CE corresponding to the resource of the fifth PUSCH and the priority of the second MAC CE corresponding to the resource of the second PUSCH.

As an example, when the fifth PUSCH carries or is to carry at least one first MAC CE, the first priority may be a priority of the first MAC CE with a highest priority; and/or when the second PUSCH carries or is to carry at least one second MAC CE, the second priority may be a priority of the second MAC CE with a highest priority.

In other words, when there is a plurality of first MAC CEs, the first priority may include the highest priority among the priorities of the plurality of first MAC CEs; and/or, when there is a plurality of second MAC CEs, the second priority may include the highest priority among the priorities of the plurality of second MAC CEs.

That is, there may be a plurality of first MAC CEs corresponding to the resource of the fifth PUSCH. In this case, the highest priority may be selected from the priorities of the plurality of first MAC CEs, and the highest priority may then be determined as the first priority.

Similarly, there may be a plurality of second MAC CEs corresponding to the resource of the second PUSCH. In this case, the highest priority may be selected from the priorities of the plurality of second MAC CEs, and the highest priority may then be determined as the second priority.

Of course, it is to be noted that the above description, the highest priority is selected as the first priority when there is a plurality of first MAC CEs as an example. In another example, one of the priorities of the plurality of first MAC CEs can be selected as the first priority according to some rule. For example, the first priority may alternatively be the priority of the first MAC CE with the lowest priority. Similarly, when there is a plurality of second MAC CEs, one of the priorities of the plurality of second MAC CEs can be selected as the second priority according to some rule. For example, the second priority may alternatively be the priority of the second MAC CE with the lowest priority. The embodiment of the present disclosure is not limited to any of these examples.

As an example, the first priority may include a priority of a first MAC CE corresponding to a resource of the fifth PUSCH and a priority of a first logical channel carried on the resource of the fifth PUSCH, and the second priority may include a priority of a second MAC CE corresponding to a resource of the second PUSCH and a priority of a second logical channel carried on the resource of the second PUSCH.

In this implementation, the first priority may include, or may be determined based on, two priorities. For example, a first weight can be set for the priority of the first MAC CE corresponding to the resource of the fifth PUSCH, and a second weight can be set for the priority of the first logical channel carried on the resource of the fifth PUSCH. Then the first priority can be determined based on the two priorities, the first weight, and the second weight. Here, the first weight and the second weight can be set depending on actual requirements.

Similarly, the second priority may also include, or may also be determined based on, two priorities. For example, a third weight can be set for the priority of the second MAC CE corresponding to the resource of the second PUSCH, and a fourth weight can be set for the priority of the second logical channel carried on the resource of the second PUSCH. Then, the second priority can be determined based on the two priorities, the third weight, and the fourth weight. Here, the third weight and the fourth weight can be set depending on actual requirements.

In addition, the priority of the first logical channel on the resource of the fifth PUSCH may also be considered as the priority of the first logical channel on the first PUSCH.

Further, the first priority may be the highest priority of the priority of the first MAC CE and/or the priority of the first logical channel.

Exemplarily, the priority of the first MAC CE may be compared with the priority of the first logical channel, and the highest priority may be selected and then determined as the first priority. For example, if the priority of the first MAC CE is higher than the priority of the first logical channel, the priority of the first MAC CE may be determined as the first priority. As another example, if the priority of the first MAC CE is lower than the priority of the first logical channel, the priority of the first logical channel may be determined as the first priority.

It is to be noted that, when the first priority includes the priority of the first MAC CE, it is considered that the priority of the first MAC CE is the highest priority. Alternatively, when the first priority includes the priority of the first logical channel, it is considered that the priority of the first logical channel is the highest priority.

Further, the second priority may be the highest priority of the priority of the second MAC CE and/or the priority of the second logical channel.

That is, the priority of the second MAC CE may be compared with the priority of the second logical channel, and the highest priority may be selected and then determined as the second priority. For example, if the priority of the second MAC CE is higher than the priority of the second logical channel, the priority of the second MAC CE may be determined as the second priority. As another example, if the priority of the second MAC CE is lower than the priority of the second logical channel, the priority of the second logical channel may be determined as the second priority.

It is to be noted that, when the second priority includes the priority of the second MAC CE, it is considered that the priority of the second MAC CE is the highest priority. Alternatively, when the second priority includes the priority of the second logical channel, the priority of the second logical channel is considered to be the highest priority.

That is, the first priority is the priority of the first MAC CE and/or the first logical channel, and the second priority is the priority of the second MAC CE and/or the second logical channel.

As an example, the first priority may include a priority of a first MAC PDU corresponding to a resource of the fifth PUSCH, and the second priority may include a priority of a second MAC PDU corresponding to a resource of the second PUSCH.

In this implementation, it can be determined which of the two conflicting resources is to be prioritized for transmission based on the priority of the first MAC PDU corresponding to the resource of the fifth PUSCH and the priority of the second MAC PDU corresponding to the resource of the second PUSCH.

As an example, the priority of the first MAC PDU may include a priority of a first MAC CE and/or a first logical channel, and the priority of the second MAC PDU may include a priority of a second MAC CE and/or a second logical channel.

In addition, the priority of the first logical channel on the resource of the fifth PUSCH may also be considered as the priority of the first logical channel on the first PUSCH.

Further, when the priority of the first MAC PDU includes the priority of the first MAC CE and the first logical channel, the priority of the first MAC PDU may be the highest priority of the priority of the first MAC CE and the priority of the first logical channel.

Further, when the priority of the second MAC PDU includes the priority of the second MAC CE and the second logical channel, the priority of the second MAC PDU may be the highest priority of the priority of the second MAC CE and the priority of the second logical channel.

As an example, when there is a plurality of first MAC CEs, the priority of the first MAC CE may be the highest priority among the priorities of the plurality of first MAC CEs; and/or, when there is a plurality of first logical channels, the priority of the first logical channel may be the highest priority among the priorities of the plurality of first logical channels. When there is a plurality of the second MAC CEs, the priority of the second MAC CE may be the highest priority among the priorities of the plurality of second MAC CEs; and/or, when there is a plurality of second logical channels, the priority of the second logical channel may be the highest priority among the priorities of the plurality of second logical channels.

It is to be noted that in the above description, the prioritized transmission resource can be determined based on priorities. In another embodiment, which of the fifth PUSCH and another resource that conflict with each other is selected to be prioritized for transmission may depend on UE implementation. For example, the UE may randomly select a resource to be prioritized for transmission. Alternatively, the UE may prioritize a resource corresponding to a new data transmission over a resource corresponding to a retransmission. Alternatively, the UE may prioritize a transmission resource that arrives earlier in the time domain over a transmission resource that arrives later in the time domain. Alternatively, the UE may prioritize a transmission resource that arrives later in the time domain over a transmission resource that arrives earlier in the time domain.

Further, the terminal may further perform at least one of the following operations:

(1) Generating a specified MAC PDU.

Here, the specified MAC PDU corresponds to the first PUSCH. In an implementation, the generation of the specified MAC PDU may actually include the following two possible situations:

The specified MAC PDU may be generated for the first third PUSCH in the first PUSCH. Alternatively, the specified MAC PDU may be generated for the first fourth PUSCH in the first PUSCH.

That is, the time point at which the specified MAC PDU is generated may be the start time point of the first third PUSCH in the first PUSCH.

As described above, the first PUSCH includes the third PUSCH. As an example, the terminal may generate the specified MAC PDU at the start time point of the third PUSCH.

Alternatively, the time point at which the specified MAC PDU is generated may be the start time point of the first fourth PUSCH in the first PUSCH.

As mentioned above, the fourth PUSCH refers to the third PUSCH that has no resource conflict with the second PUSCH in the third PUSCH. That is, in this implementation, the specified MAC PDU may be generated at the start time point of the first fourth PUSCH that has no resource conflict with the second PUSCH.

Of course, the specified MAC PDU may alternatively be generated based on the first PUSCH. Specifically, as long as there is a third PUSCH, or as long as there are duplicated PUSCH resources, or as long as there are non-conflicting duplicated PUSCH resources, or as long as there are non-conflicting third PUSCHs, or as long as there is a PUSCH prioritized for transmission, the specified MAC PDU can be generated. For example, in one of these scenarios, the specified MAC PDU can be generated for the first PUSCH. Alternatively, regardless of any condition, the specified MAC PDU can be directly generated for the first PUSCH or the first third PUSCH.

(2) Storing the specified MAC PDU in a HARQ buffer.

In order to facilitate subsequent repeated transmissions of the specified MAC PDU, the specified MAC PDU may be stored in the HARQ buffer, such that when the specified MAC PDU is transmitted subsequently, it may be directly obtained from the HARQ buffer without regeneration.

(3) Encoding the specified MAC PDU based on an encoding mode of the fourth PUSCH, and transmitting the encoded MAC PDU over the fourth PUSCH.

Since the transmission can be performed over the fourth PUSCH, after the specified MAC PDU is generated, the specified MAC PDU can be encoded based on the encoding mode corresponding to the fourth PUSCH to obtain the data block to be transmitted. The terminal can transmit the data block over the four PUSCH, i.e., over the fourth PUSCH that has no resource conflict with the second PUSCH.

(4) Encoding the specified MAC PDU based on an encoding mode of the fifth PUSCH, and transmitting the encoded MAC PDU over the fifth PUSCH.

If there is a prioritized fifth PUSCH, the specified MAC PDU can be encoded based on the encoding mode corresponding to the fifth PUSCH, and then the encoded data block can be transmitted over the fifth PUSCH. That is, the data block can be transmitted over the fifth PUSCH, which has a resource conflict with the second PUSCH and is prioritized.

As an example, when the first PUSCH is a PUSCH of a CG, a configured grant timer can be started or restarted.

Here, the configured grant timer is used to prevent a CG resource from being used for a new transmission while the timer is running. In some embodiments, the configured grant timer is defined as configuredgrantTimer.

Since the CG resource are periodical, when the first PUSCH is the PUSCH of the CG, in order to subsequently determine when the CG resource corresponding to the HARQ process can be used again or whether the transmission is successful, it is necessary to start or restart the configured grant timer after the CG resource is used for transmission.

As another example, when the first PUSCH is a PUSCH of a DG and a HARQ process corresponding to the DG is a HARQ process configured for a CG, a configured grant timer can be started or restarted.

In some embodiments, since the DG resource and the CG resource can use the same HARQ process, when the first PUSCH is the DG resource, if the HARQ process corresponding to the DG resource is the HARQ process configured for the CG, in order to subsequently determine whether to perform a retransmission, it is necessary to start or restart the configured grant timer after the DG resource is used for transmission.

As an example, when the first PUSCH is the PUSCH of the CG, or when the first PUSCH is the PUSCH of the DG and the HARQ process corresponding to the DG is the HARQ process configured for the CG, if the data block is transmitted over the fourth PUSCH, the configured grant timer can be started or restarted. That is, the terminal may start or restart the configuredgrantTimer when using the non-conflicting third PUSCH resource for transmission.

In the embodiment of the present disclosure, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block can be transmitted over the fourth PUSCH. The first PUSCH is configured for repeated transmissions of the data block. In this way, the problem of conflict handling in the conflict scenario where the third PUSCH is present can be clarified. Here, available resources can be used as much as possible, and the resource utilization can be guaranteed, such that traffic can be transmitted to a network device as quickly as possible to avoid the delay caused by the resource conflict. In addition, in this way, the network device and the terminal can have the same understanding of the conflicting resources.

To facilitate understanding, the implementation of the method will be described in detail below with reference to two specific examples.

Example 1

1. A UE receives repeated transmission configuration information configured by a network device, and the repeated transmission configuration information indicates a CG resource (i.e., a nominal PUSCH) for repeated transmissions, e.g., an uplink resource for CG index1.

2. The UE determines a time domain resource occupied by the nominal PUSCH based on the repeated transmission configuration information.

For example, the network device configures a plurality of transmissions of a CG PUSCH, the number, k, of repeated transmissions is 3, the start position S of the transmission is 11, and the length L of each transmission is 6.

3. The UE determines, based on first information, a time domain resource occupied by one or more actual PUSCHs included in the nominal PUSCH.

For example, the UE determines that a first nominal PUSCH 1 of the CG resource of CG index1 at time t1 is segmented into two actual PUSCHs, corresponding to time periods of (t1, t1+a) and (t1+a, t1+b). Specifically, since the slot boundary and downlink symbols cannot be used for uplink PUSCH transmission, the actual PUSCHs obtained after the nominal PUSCH is segmented are shown in FIG. 4, where symbols 8, 9, and 10 are downlink symbols.

4. It is assumed that the UE acquires a PUSCH resource for transmitting msg3 in a random access process, and the PUSCH resource for transmitting msg3 also covers time t1. For example, from (t1-k, t1+c), where c<=a, k>=0, the UE determines whether there is a resource conflict based on the time-frequency resources occupied by the actual PUSCHs.

It can be appreciated that the first actual PUSCH 1 of the first nominal PUSCH 1 conflicts with the PUSCH resource for transmitting msg3, and the remaining actual PUSCH 2 of the first nominal PUSCH 1 does not conflict with the PUSCH resource for transmitting msg3. Then, the UE transmits the actual PUSCH 2, that is, the UE generates a MAC PDU, and transmits it over the actual PUSCH 2. Further, the UE may also store the MAC PDU in the HARQ buffer.

In addition, for the first actual PUSCH 1 of the first CG, the UE determines a first priority corresponding to the actual PUSCH 1 and a second priority of the PUSCH resource for transmitting msg3, to determine which resource is to be prioritized for transmission. For example, assuming that the first priority corresponding to the actual PUSCH 1 is higher than the second priority of the PUSCH resource for transmitting msg3, the actual PUSCH 1 is prioritized for transmission. For the scheme of determining the first priority and the second priority, reference can be made to the above description.

In this way, since there are other nominal PUSCHs (nominal PUSCH 2 and nominal PUSCH 3) and a non-conflicting actual PUSCH (actual PUSCH 2), even if some actual PUSCH conflicts with other resources, the corresponding MAC PDU can be generated and transmitted over the non-conflicting actual PUSCH.

Further, if the actual PUSCH is a CG resource, or if the actual PUSCH is a DG resource but a HARQ process corresponding to the DG resource is a HARQ process configured for a CG, the terminal can start or restart the configuredgrantTimer when transmitting the non-conflicting actual PUSCH.

Example 2

1. A UE receives repeated transmission configuration information configured by a network device, and the repeated transmission configuration information indicates a CG resource (i.e., a nominal PUSCH) for repeated transmissions, e.g., an uplink resource for CG index1.

2. The UE determines a time domain resource occupied by the nominal PUSCH based on the repeated transmission configuration information.

For example, the network device configures a plurality of transmissions of a CG PUSCH, the number, k, of repeated transmissions is 3, the start position S of the transmission is 11, and the length L of each transmission is 6.

3. The UE determines, based on first information, a time domain resource occupied by one or more actual PUSCHs included in the nominal PUSCH.

For example, the UE determines that a first nominal PUSCH 1 of the CG resource of CG index1 at time t1 is segmented into two actual PUSCHs, corresponding to time periods of (t1, t1+a) and (t1+a, t1+b). Specifically, since the slot boundary and downlink symbols cannot be used for uplink PUSCH transmission, the actual PUSCHs obtained after the nominal PUSCH is segmented are shown in FIG. 4.

4. It is assumed that the UE receives DG scheduling which is configured for repeated transmissions. Specifically, the number of repeated DG transmissions is 2, the start position is 11, and the symbol length is 3. The first DG USCH resource also covers time t1. For example, the corresponding time domain position is in the range of (t1, t1+a). Since it does not cross a slot, actual PUSCH=nominal PUSCH. The second DG PUSCH corresponds to a time domain range of (t1+a, t1+b), i.e., actual PUSCH=nominal PUSCH.

5. The UE determines whether there is a resource conflict based on the time-frequency resources occupied by the actual PUSCHs.

Here, the first actual PUSCH 1 of the first CG conflicts with the first actual PUSCH of the first DG, the second actual PUSCH of the first CG conflicts with the second actual PUSCH of the second DG, and the other actual PUSCHs of the CG does not conflict. In this case, the UE generates a MAC PDU and transmits the MAC PDU over the non-conflicting actual PUSCH. Further, the UE stores the MAC PDU in the corresponding HARQ buffer.

In addition, for the conflicting actual PUSCH, the UE may further determine which resource is to be prioritized for transmission based on the priorities of the two conflicting resources. For details of the process for determining the priorities, reference can be made to the above description.

Further, if the actual PUSCH is a CG resource, or if the actual PUSCH is a DG resource but a HARQ process corresponding to the DG resource is a HARQ process configured for a CG, the terminal can start or restart the configuredgrantTimer when transmitting the non-conflicting actual PUSCH.

Figure 5:
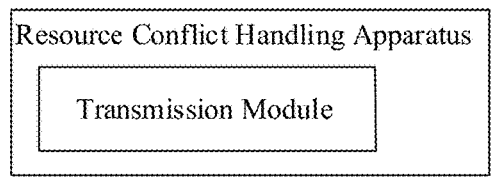
FIG. 5 is a schematic diagram showing a structure of a resource conflict handling apparatus according to an exemplary embodiment of the present disclosure.

FIG. 5 is a schematic diagram showing a structure of a resource conflict handling apparatus according to an exemplary embodiment. Referring to FIG. 5, the apparatus may include: a transmission module 510 configured to transmit, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block over the fourth PUSCH. Here, the first PUSCH is configured for repeated transmissions of the data block.

In a possible implementation of the present disclosure, the transmission module 510 may be further configured to: determine that the first PUSCH and the second PUSCH overlap or conflict with respect to time domain resources when the third PUSCH included in the first PUSCH and the second PUSCH overlap or conflict with respect to time domain resources.

In a possible implementation of the present disclosure, the transmission module 510 may be further configured to: receive repeated transmission configuration information, the repeated transmission configuration information indicating at least one of a transmission start position, a number of repeated transmissions, and a time length of each repeated transmission for the first PUSCH; and determine a time domain resource of the third PUSCH based on the repeated transmission configuration information and first information, the first information being used to determine a presence of the third PUSCH, a resource position of the third PUSCH, or the presence of the third PUSCH and the resource position of the third PUSCH when the third PUSCH is determined to be present.

In a possible implementation of the present disclosure, the first information may include at least one of slot boundary information, uplink/downlink configuration information, first resource indication information, and second resource indication information. The first resource indication information may indicate a specified resource or a cross-boundary situation. The specified resource is not used as a transmission resource of the first PUSCH. The second resource indication information may include target indication information and/or resource information. The target indication information indicates a presence of the third PUSCH and the resource information indicates a resource position of the third PUSCH.

In a possible implementation of the present disclosure, the second resource indication information may be configured or indicated by a network device, or the second resource indication information may be indicated by a physical layer of a terminal.

In a possible implementation of the present disclosure, the first PUSCH may be a PUSCH of a first Configured Grant (CG), and the second PUSCH may be a PUSCH of a second CG.

In a possible implementation of the present disclosure, the first PUSCH may be a PUSCH of a first CG, the second PUSCH may be a PUSCH indicated in a first Random Access Response (RAR), or the second PUSCH may be a PUSCH of a first Dynamic Grant (DG).

In a possible implementation of the present disclosure, the first PUSCH may be a PUSCH indicated in a first RAR, or the first PUSCH may be a PUSCH of a second DG, and the second PUSCH may be a PUSCH of a second CG.

In a possible implementation of the present disclosure, the first PUSCH may be a PUSCH indicated in a first RAR, or the first PUSCH may be a PUSCH of a second DG, and the second PUSCH may be a PUSCH indicated in a second RAR. Alternatively, the first PUSCH may be a PUSCH indicated in a first RAR, or the first PUSCH may be a PUSCH of a second DG, and the second PUSCH may be a PUSCH of a first DG.

In a possible implementation of the present disclosure, the transmission module 510 may be further configured to: determine priorities of transmission resources based on the third PUSCH included in the first PUSCH and the second PUSCH.

In a possible implementation of the present disclosure, the transmission module 510 may be configured to: determine a prioritized transmission resource based on a first priority corresponding to a fifth PUSCH and a second priority corresponding to the second PUSCH, the fifth PUSCH being at least one third PUSCH in the third PUSCH that overlaps the second PUSCH with respect to time domain resources.

In a possible implementation of the present disclosure, the first priority may be a priority of a resource of the fifth PUSCH, and the second priority may be a priority of a resource of the second PUSCH.

In a possible implementation of the present disclosure, the first priority may be a priority of a first logical channel carried on a resource of the fifth PUSCH, and the second priority may be a priority of a second logical channel carried on a resource of the second PUSCH.

In a possible implementation of the present disclosure, when the fifth PUSCH carries or is to carry at least one first logical channel, the first priority may be a priority of the first logical channel with a highest priority; and/or when the second PUSCH carries or is to carry at least one second logical channel, the second priority may be a priority of the second logical channel with a highest priority.

In a possible implementation of the present disclosure, the first priority may be a priority of a first Media Access Control (MAC) Control Element (CE) corresponding to a resource of the fifth PUSCH, and the second priority may be a priority of a second MAC CE corresponding to a resource of the second PUSCH, the first MAC CE and the second MAC CE being in different MAC PDUs.

In a possible implementation of the present disclosure, when the fifth PUSCH carries or is to carry at least one first MAC CE, the first priority may be a priority of the first MAC CE with a highest priority; and/or when the second PUSCH carries or is to carry at least one second MAC CE, the second priority may be a priority of the second MAC CE with a highest priority.

In a possible implementation of the present disclosure, the first priority may include a priority of a first MAC CE corresponding to a resource of the fifth PUSCH and a priority of a first logical channel carried on the resource of the fifth PUSCH, and the second priority may include a priority of a second MAC CE corresponding to a resource of the second PUSCH and a priority of a second logical channel carried on the resource of the second PUSCH.

In a possible implementation of the present disclosure, the first priority may be a priority of a first MAC PDU corresponding to a resource of the fifth PUSCH, and the second priority may be a priority of a second MAC PDU corresponding to a resource of the second PUSCH.

In a possible implementation of the present disclosure, the priority of the first MAC PDU may include a priority of a first MAC CE and/or a first logical channel, and the priority of the second MAC PDU may include a priority of a second MAC CE and/or a second logical channel.

In a possible implementation of the present disclosure, when there is a plurality of first MAC CEs, the priority of the first MAC CE may be a highest priority among priorities of the plurality of first MAC CEs, and/or when there is a plurality of first logical channels, the priority of the first logical channel may be a highest priority among priorities of the plurality of first logical channels; and/or when there is a plurality of second MAC CEs, the priority of the second MAC CE may be a highest priority among priorities of the plurality of second MAC CEs, and/or when there is a plurality of second logical channels, the priority of the second logical channel may be a highest priority among priorities of the plurality of second logical channels.

In a possible implementation of the present disclosure, the first priority may be the highest priority of the priority of the first MAC CE and/or the priority of the first logical channel.

In a possible implementation of the present disclosure, the second priority may be the highest priority of the priority of the second MAC CE and/or the priority of the second logical channel.

In a possible implementation of the present disclosure, the transmission module 510 may be configured to perform at least one of:
generating a specified MAC PDU;
storing the specified MAC PDU in a HARQ buffer; and
encoding the specified MAC PDU based on an encoding mode of the fourth PUSCH, and transmitting the encoded MAC PDU over the fourth PUSCH.

In a possible implementation of the present disclosure, the transmission module 510 may be configured to: generate a MAC PDU for the first third PUSCH in the first PUSCH; or generate a MAC PDU for the first fourth PUSCH in the first PUSCH.

In a possible implementation of the present disclosure, the transmission module 510 is configured to: start or restart a configured grant timer when the first PUSCH is a PUSCH of a CG; or start or restart a configured grant timer when the first PUSCH is a PUSCH of a DG and a HARQ process corresponding to the DG is a HARQ process configured for a CG.

In the embodiment of the present disclosure, when a first PUSCH and a second PUSCH overlap or conflict with respect to time domain resources, if there is a fourth PUSCH in a third PUSCH included in the first PUSCH that does not overlap or conflict with the second PUSCH with respect to time domain resources, a data block can be transmitted over the fourth PUSCH. The first PUSCH is configured for repeated transmissions of the data block. In this way, the problem of conflict handling in the conflict scenario where the third PUSCH is present can be clarified. Here, available resources can be used as much as possible, and the resource utilization can be guaranteed, such that traffic can be transmitted to a network device as quickly as possible to avoid the delay caused by the resource conflict. In addition, in this way, the network device and the terminal can have the same understanding of the conflicting resources.

Figure 6:
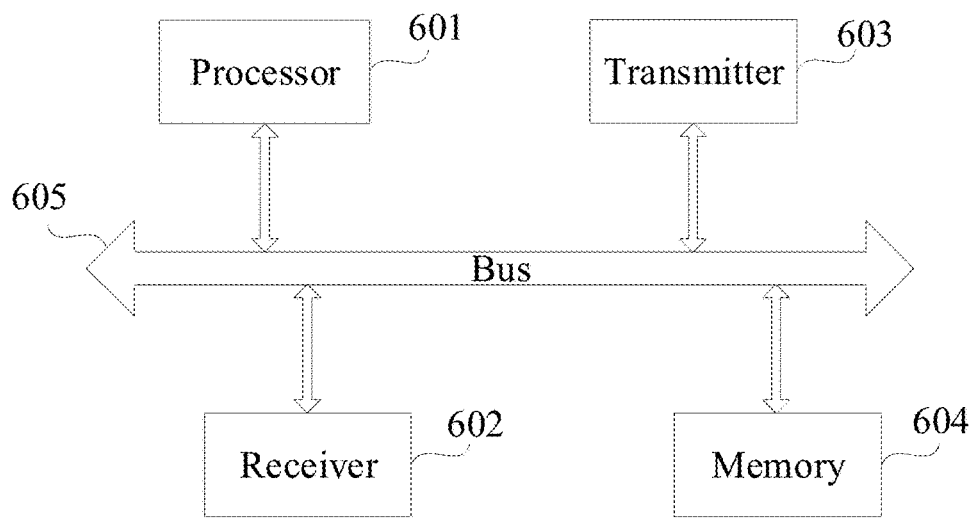
FIG. 6 is a schematic diagram showing a structure of a terminal according to an exemplary embodiment of the present disclosure.

FIG. 6 is a schematic diagram showing a structure of a terminal according to an exemplary embodiment of the present disclosure. The terminal includes: a processor 601, a receiver 602, a transmitter 603, a memory 604, and a bus 605.

The processor 601 includes one or more processing cores, and the processor 601 is configured to perform various functional applications and information processing by executing software programs and modules.

The receiver 602 and the transmitter 603 may be implemented as a communication component, which may be a communication chip.

The memory 604 is connected to the processor 601 via the bus 605.

The memory 604 may be configured to store at least one instruction, and the processor 601 is configured to execute the at least one instruction, so as to implement various steps performed by the terminal in each of the above method embodiments.

In addition, the memory 604 may be implemented by any type of volatile or non-volatile storage device or any combination thereof. The volatile or non-volatile storage devices include but are not limited to: magnetic disk or optical disc, Electrically Erasable Programmable Read-Only Memory (EEPROM), Erasable Programmable Read-Only Memory (EPROM), Static Random-Access Memory (SRAM), Read-Only Memory (ROM), magnetic memory, flash memory, Programmable Read-Only Memory (PROM), etc.

The present disclosure provides a computer-readable storage medium. The storage medium has at least one instruction stored therein. The at least one instruction can be loaded and executed by the processor to implement the method according to any of the above method embodiments.

The present disclosure also provides a computer program product, which, when executed on a computer, enables the computer to perform the method according to any of the above method embodiments.

It can be appreciated by those of ordinary skill in the art that all or part of the steps in the above embodiment can be implemented by hardware, or by a program instructing relevant hardware. The program can be stored in a computer-readable storage medium, which can be a read-only memory, a magnetic disk or an optical disc, etc.

While the preferred embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. A resource conflict handling method, comprising:
   receiving configuration information for repeated transmission of a data block, the configuration information indicating a transmission start position, a number of repeated transmissions, and a time length of each repeated transmission for a first Physical Uplink Share Channel (PUSCH), wherein the first PUSCH is configured for repeated transmissions of the data block and the first PUSCH is a PUSCH of a first Configured Grant (CG);
   determining a time domain resource of a third PUSCH included in the first PUSCH based on the configuration information and first information, the third PUSCH being obtained by segmenting the first PUSCH based on the first information in response to the repeated transmission of the data block crossing a slot boundary or conflicting with a downlink symbol configured by the network device; and
   transmitting the data block over a fourth PUSCH while transmitting another data on a second PUSCH, when the third PUSCH and the second PUSCH overlap or conflict with respect to time domain resources, and wherein the fourth PUSCH is the part in the third PUSCH that does not overlap or conflict with the second PUSCH with respect to time domain resources, wherein the second PUSCH is a PUSCH of a second Configured Grant (CG).

2. The method according to claim 1, wherein
   the first information comprises at least one of slot boundary information, uplink/downlink configuration information, and first resource indication information,
   wherein the first resource indication information indicates a specified resource, and the specified resource not being used as a transmission resource of the first PUSCH.

3. A terminal, comprising a processor and a memory, the memory storing at least one instruction executable by the processor to implement a resource conflict handling method, the method comprising:
   receiving configuration information for repeated transmission of a data block, the configuration information indicating a transmission start position, a number of repeated transmissions, and a time length of each repeated transmission for a first Physical Uplink Share Channel (PUSCH), wherein the first PUSCH is configured for repeated transmissions of the data block and the first PUSCH is a PUSCH of a first Configured Grant (CG);
   determining a time domain resource of a third PUSCH included in the first PUSCH based on the configuration information and first information, the third PUSCH being obtained by segmenting the first PUSCH based on the first information in response to the repeated transmission of the data block crossing a slot boundary or conflicting with a downlink symbol configured by the network device; and
   transmitting the data block over a fourth PUSCH while transmitting another data on a second PUSCH, when the third PUSCH and the second PUSCH overlap or conflict with respect to time domain resources, and wherein the fourth PUSCH is the part in the third PUSCH that does not overlap or conflict with the second PUSCH with respect to time domain resources, wherein the second PUSCH is a PUSCH of a second Configured Grant (CG).

4. The terminal according to claim 3, wherein
   the first information comprises at least one of slot boundary information, uplink/downlink configuration information, and first resource indication information,
   wherein the first resource indication information indicates a specified resource, and the specified resource not being used as a transmission resource of the first PUSCH.

5. A non-transitory computer-readable storage medium storing at least one instruction executable by the processor to implement the resource conflict handling method, the method comprising:
   receiving configuration information for repeated transmission of a data block, the configuration information indicating a transmission start position, a number of repeated transmissions, and a time length of each repeated transmission for a first Physical Uplink Share Channel (PUSCH), wherein the first PUSCH is configured for repeated transmissions of the data block and the first PUSCH is a PUSCH of a first Configured Grant (CG);
   determining a time domain resource of a third PUSCH included in the first PUSCH based on the configuration information and first information, the third PUSCH being obtained by segmenting the first PUSCH based on the first information in response to the repeated transmission of the data block crossing a slot boundary or conflicting with a downlink symbol configured by the network device; and
   transmitting the data block over a fourth PUSCH while transmitting another data on a second PUSCH, when the third PUSCH and the second PUSCH overlap or conflict with respect to time domain resources, and wherein the fourth PUSCH is the part in the third PUSCH that does not overlap or conflict with the second PUSCH with respect to time domain resources, wherein the second PUSCH is a PUSCH of a second Configured Grant (CG).

6. The non-transitory computer-readable storage medium according to claim 5, wherein
   the first information comprises at least one of slot boundary information, uplink/downlink configuration information, and first resource indication information,
   wherein the first resource indication information indicates a specified resource, and the specified resource not being used as a transmission resource of the first PUSCH.

* * * * *